United States Patent
Manno et al.

(10) Patent No.: US 7,677,287 B2
(45) Date of Patent: Mar. 16, 2010

(54) HEAVY LOAD RADIAL TIRE

(75) Inventors: Akira Manno, Kobe (JP); Yukihide Ouya, Kobe (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 468 days.

(21) Appl. No.: 11/648,785

(22) Filed: Jan. 3, 2007

(65) Prior Publication Data

US 2007/0169870 A1    Jul. 26, 2007

(30) Foreign Application Priority Data

Jan. 26, 2006    (JP)    .............................. 2006-018127

(51) Int. Cl.
*B60C 9/00*    (2006.01)
*B60C 9/18*    (2006.01)
*B60C 9/28*    (2006.01)

(52) U.S. Cl. .................. 152/526; 152/532; 152/533; 152/535; 152/538

(58) Field of Classification Search .................. 152/526, 152/527, 528, 529, 530, 531, 532, 533, 534, 152/535, 536, 537, 538
See application file for complete search history.

(56) References Cited

U.S. PATENT DOCUMENTS 5,360,047 A * 11/1994 Fujiwara ..................... 152/454
6,315,019 B1 * 11/2001 Garlaschelli et al. ........ 152/527
6,536,430 B1    3/2003 Smith

FOREIGN PATENT DOCUMENTS

JP    3398065 B2    2/2003
JP    2003-291610    * 10/2003

* cited by examiner

*Primary Examiner*—Justin Fischer
(74) *Attorney, Agent, or Firm*—Birch, Stewart, Kolasch & Birch, LLP

(57) ABSTRACT

A belt layer 7 of a heavy load radial tire includes second and third belt plies 7B and 7C in which belt cords are arranged at an angle in a range of 10 to 45° with respect to a circumferential direction of the tire, and a fourth belt ply 7D which is disposed outside of the second and third belt plies 7B and 7C and which is spirally wound in the circumferential direction of the tire. When ply widths of the belt plies 7B to 7D are defined as W2 to W4 and a tread ground-contact width is defined as Tw, the following relations are established: $0.85\text{Tw} \leq \text{W2}$, $0.85\text{Tw} \leq \text{W3}$, $(\text{W2}-\text{W3}) \geq 14$ mm, $\text{W4} \geq 40$ mm. A distance K between a tire equator and an outer end of the fourth belt ply 7D is in a range of 35% to 40% of the tread ground-contact width Tw. A reinforcing rubber layer 10 having the maximum thickness T1 of not less than 3.0 mm and a complex elastic modulus $E^*$ of in a range of 6.0 to 12.0 MPa is disposed between outer ends of the second and third belt plies 7B and 7C.

15 Claims, 5 Drawing Sheets

HEAVY LOAD RADIAL TIRE

BACKGROUND OF THE INVENTION

1. Field of the Invention

The present invention relates to a heavy load radial tire which is suitable for a tire having an aspect ratio of not more than 50%, and which suppresses a deviated wear and a crack in a groove bottom by improving a belt layer.

2. Description of the Related Art

Generally, in a heavy load radial tire such as a truck and a bus, a belt layer a disposed radially outside of the carcass comprises three to four belt plies b having steel belt cords as shown in FIG. 5. In the conventional technique, a first belt play b1 disposed on the radially innermost side has a cord angle with respect to the circumferential direction of the tire is in a range of 60±15°. An outer side second to third belt plies, or the second to fourth belt plies have cord angles in a range of 10 to 35° with respect to the circumferential direction of the tire. The cord inclining directions of the second and third belt plies b2 and b3 are opposite from each other. This forms a triangle structure in which the belt cords intersect with each other between the first and second belt plies b1 and b2, and between the second and third belt plies b2 and b3, this enhanced the rigidity of the belt, and the tread portion is reinforced with a hoop effect.

On the other hand, as the maintenance of expressway and the performance of vehicles are enhanced, there is a tendency that a wide tire is used. In the wide tire, an aspect ratio which is a ratio of a height of a tire cross section to a width of the tire cross section (height of tire cross section to width of the tire cross section) is reduced, and the steering stability is enhanced.

In the wide tire, especially a wide tire having the aspect ratio of not more than 50%, the tread portion becomes wide and the tread profile becomes flat. Therefore, in the conventional belt layer, the binding force is insufficient, and outer diameter growth of the tread portion, especially outer diameter growth in a tread shoulder region becomes high. As a result, the ground contact pressure in the tread shoulder region is increased, deviated wear is caused, and peeling damage is prone to be generated at the belt end due to a temperature rise. Further, stress acting on a groove bottom of a tread groove formed in the tread shoulder region is increased, and there is a tendency that damage such as a crack is produced in the groove bottom.

SUMMARY OF THE INVENTION

It is an object of the present invention to provide a heavy load radial tire capable of enhancing a binding force of a belt layer over a wide range with excellent balance, capable of suppressing the outer diameter growth of at read portion especially in a tread shoulder region in a wide heavy load radial tire having an aspect ratio of not more than 50%, and capable of preventing deviated wear, peeling of a belt and a crack in a tread groove bottom from being generated.

To achieve the above object, claim 1 of this application provides a heavy load radial tire comprising a carcass extending from a tread portion to a bead core of a bead portion through a sidewall portion, and a belt layer disposed radially outward of the carcass and in the tread portion, wherein the belt layer includes a second belt ply in which a belt cord is arranged at an angle $\theta 2$ in a range of 10 to 45° with respect to a circumferential direction of the tire, a third belt ply which is disposed radially outward of the second belt ply, in which a belt cord is arranged at an angle of $\theta 3$ in a range of 10 to 45° with respect to the circumferential direction of the tire and an inclining direction of the third belt ply is opposite from that of the belt cord of the second belt ply, and a fourth belt ply which is disposed radially outward of the third belt ply, in which a belt cord is spirally wound at an angle $\theta 4$ of not more than 5° with respect to the circumferential direction of the tire, wherein ply widths W2 and W3 of the second and third belt plies in an axial direction of the tire are not less than 85% of a tread ground-contact width Tw, a ply width W4 of the fourth belt ply in the axial direction of the tire is not less than 40 mm, a distance K between an outer end of the fourth belt ply in the axial direction of the tire to a tire equator is in a range of 35% to 40% of the tread ground-contact width Tw, a difference W2−W3 of the ply widths W2 and W3 of the second and third belt plies in the axial direction of the tire is not less than 14 mm, a reinforcing rubber layer is disposed between outer ends of the second and third belt plies in the axial direction of the tire, a maximum thickness T1 of the reinforcing rubber layer is not less than 3.0 mm, and a complex elastic modulus E*1 of the reinforcing rubber layer is in a range of 6.0 to 12.0 MPa.

The tread ground-contact width means the maximum width of a ground-contact surface in the axial direction of the tire which is assembled to a normal rim and into which normal internal pressure is charged and which comes into contact with the ground when a normal load is applied. Here, the "normal rim" is a rim determined for each tire by a standard including one on which the tire is based, and the normal rim is a standard rim in the case of JATMA, a "Design Rim" in the case of TRA, and a "Measuring Rim" in the case of ETRTO. Further, "normal internal pressure" means an air pressure determined for each tire by a standard. The "normal internal pressure" is a maximum air pressure in JATMA, a maximum value described in "TIRE LOAD LIMITS AT VARIOUS COLD INFLATION PRESSURES" in the case of TRA, and "INFLATION PRESSURE" in the case of ETRTO. Further, the "normal load" is a load determined for each tire by the standard, and is a maximum load ability in the case of JATMA, a maximum value described in a Table "TIRE LOAD LIMITS AT VARIOUS COLD INFLATION PRESSURES" in the case of TRA, and a "LOAD CAPACITY" in the case of ETRO.

The complex elastic modulus E*1 is a value measured using a viscoelasticity spectrometer under the conditions of temperature of 70° C., frequency of 10 Hz, initial extension distortion of 10%, and amplitude of ±2% of dynamic distortion.

As described above, according to the present invention, the belt layer includes the second and third belt plies in which the cord angle is in the range of 10 to 45° and the belt cords intersect with each other between the plies, and the fourth belt ply which is disposed radially outside of the third belt ply and in which the belt cord is spirally wound in the circumferential direction of the tire, and the width of each belt ply is set to a predetermined value. With this, the excellent hoop effect can exhibited over a wide range, the outer diameter growth of the tread portion can uniformly be suppressed, and it is possible to prevent the deviated wear, peel of the belt, a crack in a tread groove bottom from being generated.

Further, a reinforcing rubber layer having the maximum thickness T1 of not less than 3.0 mm and the complex elastic modulus E*1 of 6.0 to 12.0 MPa is disposed between the outer ends of the second and third belt plies in the axial direction of the tire. With this, it is possible to suppress the cord end loose in the outer ends of the second and third belt plies, and to secure the excellent rigidity to the outer ends of the belt layers. It is possible to further enhance the deviated wear resistance, peeling resistance of the belt end, the crack resistance, and the steering stability.

DETAILED DESCRIPTION OF THE PREFERRED EMBODIMENTS

Figure 1:
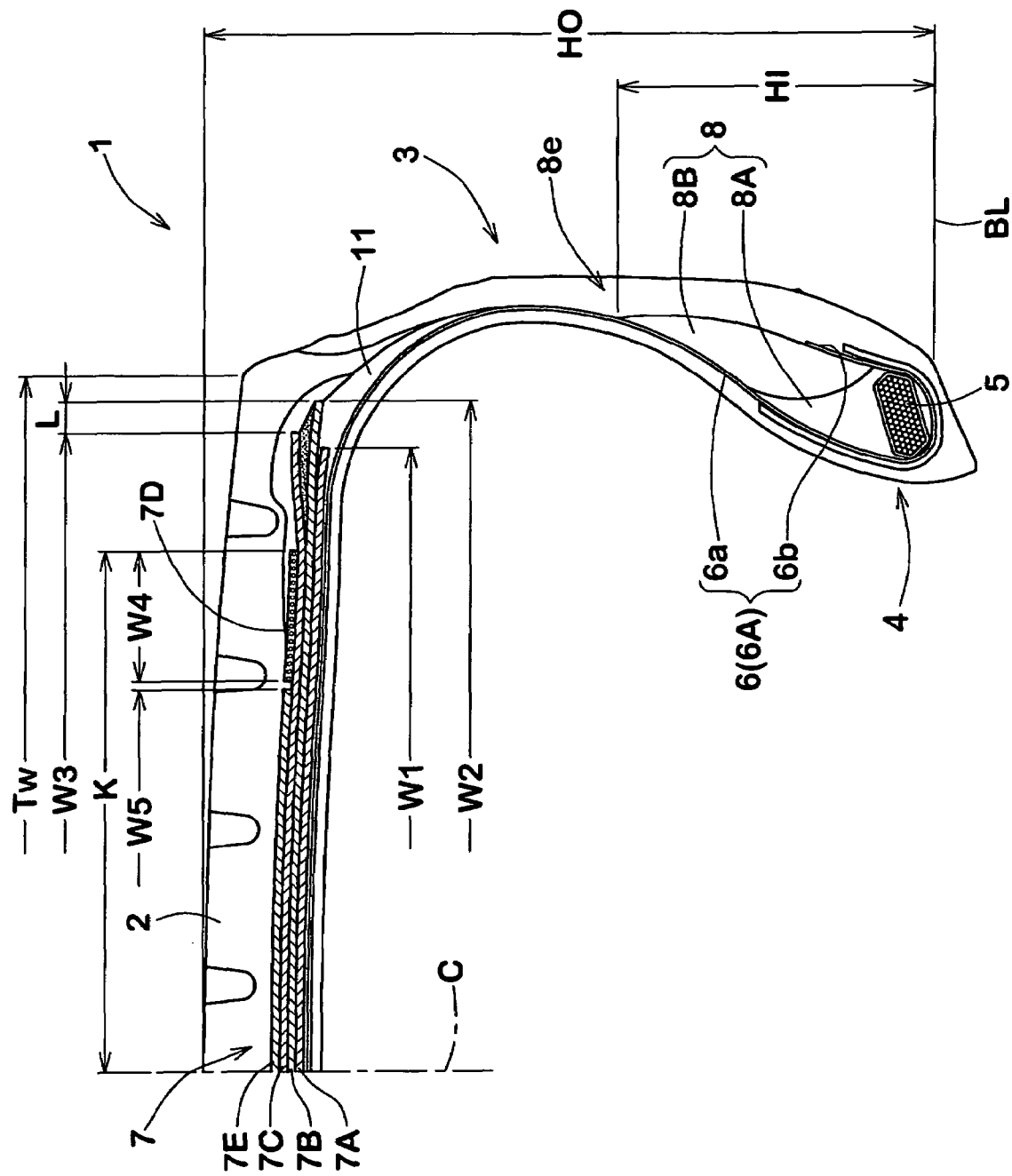
FIG. 1 is a sectional view showing one embodiment of a heavy load radial tire of the present invention.
Figure 2:
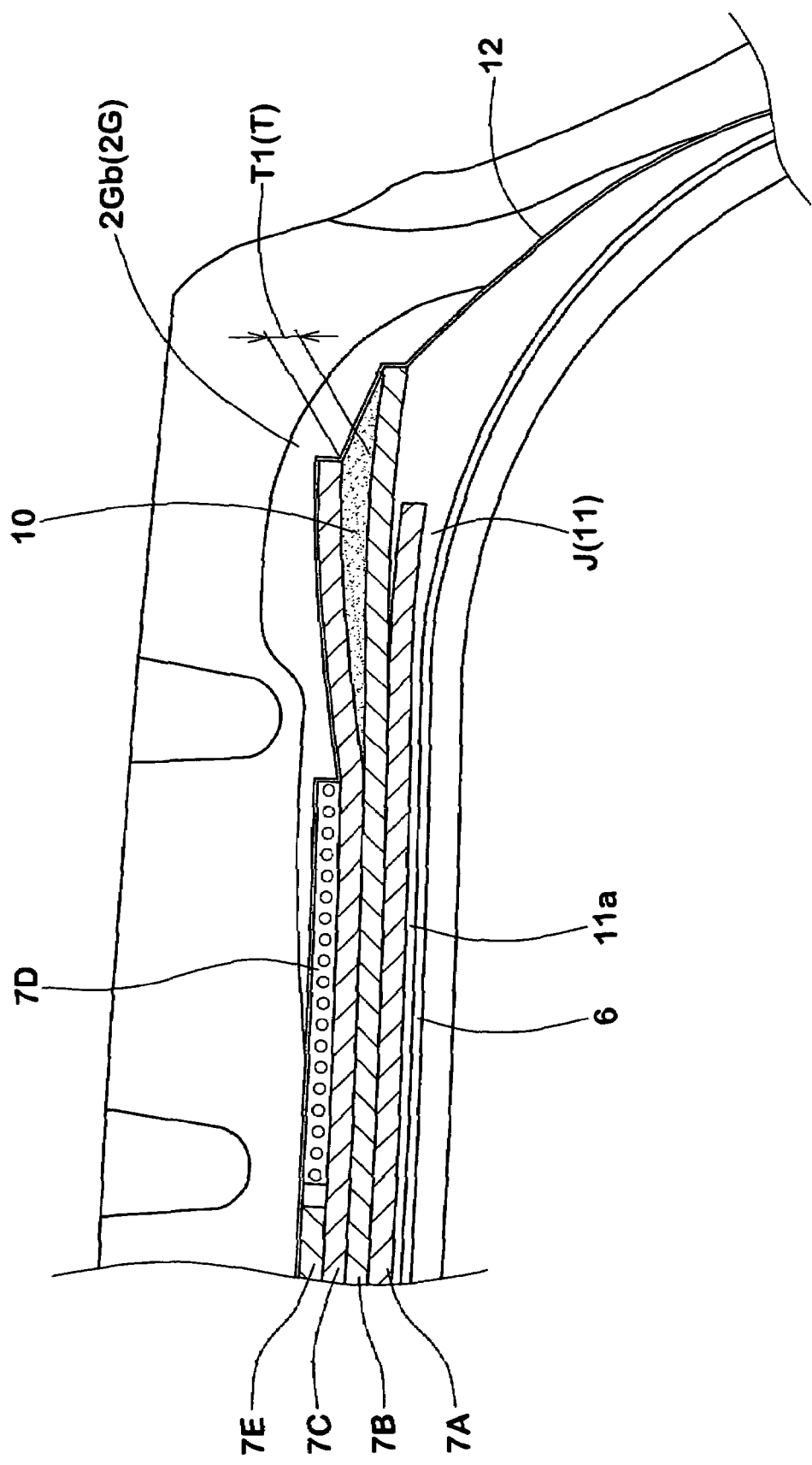
FIG. 2 is an enlarged sectional view of a tread portion of the tire.

An embodiment of the present invention will be explained together with illustrated examples. FIG. 1 is a sectional view of a heavy load radial tire of the invention. FIG. 2 is an enlarged sectional view of a tread portion of the tire. As shown in FIG. 1, the heavy load radial tire 1 includes a carcass 6 extending from a tread portion 2 to a bead core 5 of a bead portion 4 through a sidewall portion 3, and a belt layer 7 disposed radially outside of the carcass 6 and inside of the tread portion 2. This embodiment shows a wide tire in which an aspect ratio which is a ratio of the height of a tire cross section to the width of the tire cross section (height of a tire cross section/width of the tire cross section) is reduced to not more than 50%.

The carcass 6 comprises one or more (one, in this embodiment) carcass ply 6A in which carcass cords are arranged at an angle of 75 to 90° with respect to the circumferential direction of the tire. In the carcass ply 6A, both ends of the ply main body 6a extending between the bead cores 5 and 5 are continuously provided with folded-back portions 6b which are folded back from inside to outside in the axial direction of the tire around the bead cores 5 and 5. A bead-reinforcing bead apex rubber 8 is disposed between the ply main body 6a and the folded-back portion 6b. The bead apex rubber 8 extends from the bead core 5 radially outward and has a triangular cross section. The carcass cord is preferably steel cord, but organic fiber cords such as aromatic polyamide, nylon, rayon, and polyester can also be employed.

In this embodiment, the bead apex rubber 8 includes an apex portion 8A which is made of rubber having rubber hardness of 80 to 95° and which is located on the radially inner side, and an apex portion 8B which is made of soft rubber having rubber hardness of 40 to 60° and which is located on the radially outer side. The height H1 of the radially outer end 8e of the bead apex rubber 8 from a bead base line BL is set in a range of 35 to 50% of the tire cross section height H0. With this, the side rigidity of the tire is increased and the steering stability is enhanced while suppressing damage of the outer end 8e.

The belt layer 7 includes at least first to fourth belt plies 7A to 7D which are sequentially superposed from a radially inner side to an outer side. A steel cord is used as the belt cord of each belt ply. In this embodiment, the same steel cords are used for the belt plies.

Figure 3:
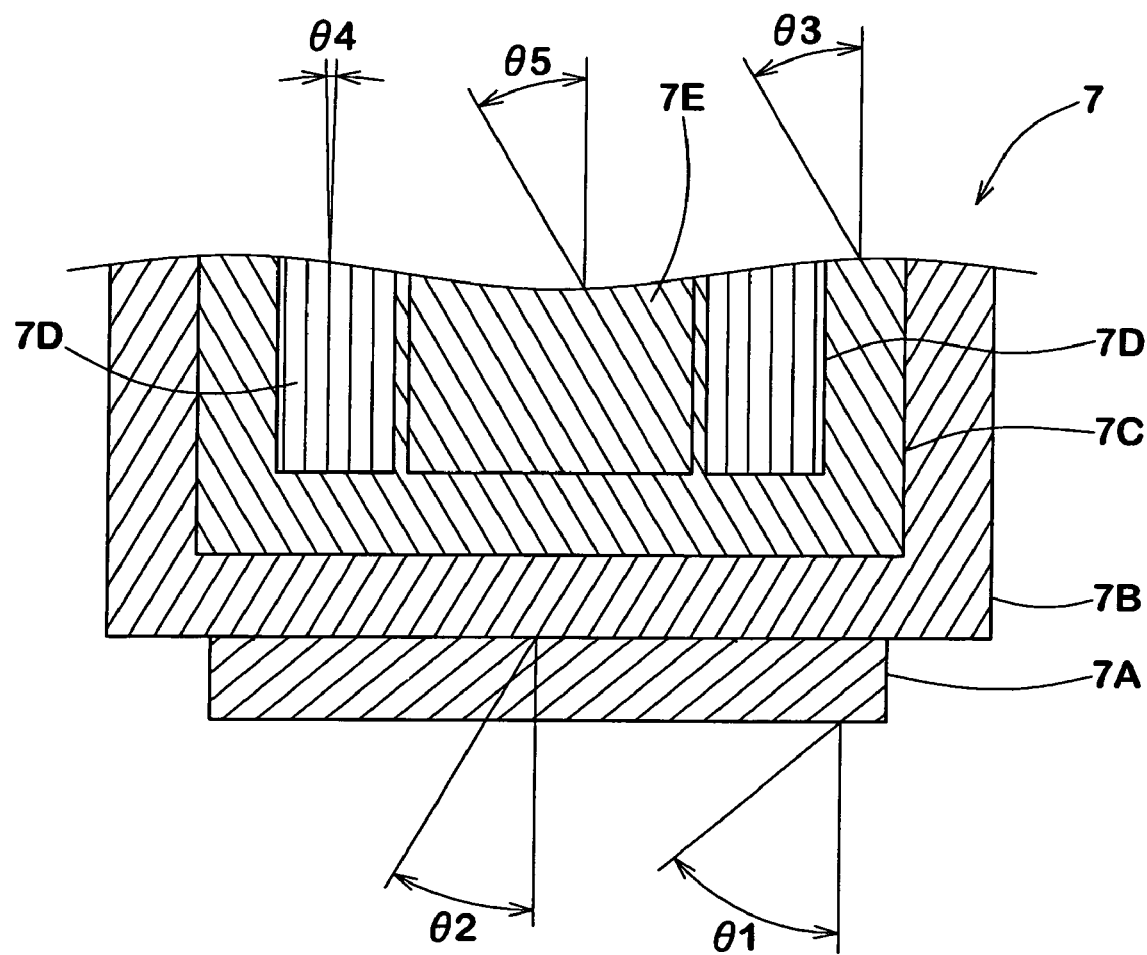
FIG. 3 is a diagram used for explaining arrangement of cords of belt plies.

As shown in FIG. 3, in the first belt ply 7A disposed on the radially innermost side, the belt cord is inclined at an angle θ1 in a range of 45 to 75° with respect to the circumferential direction of the tire. In the second belt ply 7B, the belt cord is inclined at an angle θ2 which is smaller than the angle θ1 and in a rang of 10 to 45° with respect to the circumferential direction of the tire. In the third belt ply 7C , the belt cord is inclined at an angle θ3 in a range of 10 to 45° with respect to the circumferential direction of the tire in the opposite inclination direction from that of the belt cord of the second belt ply 7A.

Each of the fourth belt plies 7D and 7D is disposed at a distance from both sides of a tire equator C. The fourth belt ply 7D is formed as a so-called endless ply in which a belt cord is spirally wound at an angle θ4 of not more than 5° with respect to the circumferential direction of the tire.

In this embodiment, the fifth belt ply 7E is disposed on the tire equator C and between the fourth belt plies 7D and 7D. In this embodiment, a belt cord of the fifth belt ply 7E is inclined at an angle θ5 in a range of 10 to 45° with respect to the circumferential direction of the tire in the same inclining direction as that of the third belt ply 7C.

Ply widths W2 and W3 of the second and third belt plies 7B and 7C are not less than 85% of the tread ground-contact width Tw. In this embodiment, the ply width W2 is set greater than the ply width W3. At that time, it is necessary that a difference W2−W3 between the ply widths W2 and W3 is not less than 14 mm. With this, outer ends of the second and third belt plies 7B and 7C can be separated from each other by a distance of at least 7 mm in the axial direction of the tire. As a result, stress centering on the outer ends of the second and third belt plies 7B and 7C can be moderated. The upper limits of the ply widths W2 and W3 are not more than 100% of the tread ground-contact width Tw. The ply width W4 of the fourth belt ply 7D in the axial direction of the tire is not less than 40 mm, and the distance K between the tire equator C and the outer end of the fourth belt ply 7D in the axial direction of the tire is in a range of 35% to 40% of the tread ground-contact width Tw.

In the belt layer 7 having such a structure, the belt cords of at least the second to fourth belt plies 7B to 7D intersect with each other and the strong triangle structure is formed and thus, the necessary belt rigidity can be secured. An endless ply formed by spirally winding a steel belt cord is used as the fourth belt ply 7D. Therefore, the insufficient binding force in the tread shoulder region can be increased intensively, excellent hoop effect can be exhibited over the wide range, the outer diameter growth in the tread portion can uniformly be suppressed, and it is possible to prevent the deviated wear, peeling of the belt end and a crack in the tread groove bottom from being generated. Especially in this embodiment, the first belt ply 7A is inclined at the belt cord angle of θ1 which is between the carcass cord angle and the belt cord angle θ2. Therefore, it is possible to reduce the cord angle difference between the adjacent carcass ply and the belt ply while increasing the rigidity of the belt, and the peeling between the plies can be suppressed. For this purpose, it is preferable that the inclining directions of the belt cords of the first belt ply 7A and the second belt ply 7B are the same. It is preferable that the ply width W1 of the first belt ply 7A in the axial direction of the tire is not less than 85% of the tread ground-contact width Tw in terms of belt rigidity. It is preferable that the ply width W1 is narrower than the ply width W2 by at least 14 mm for suppressing the peeling of the ply end. That is, it is preferable that (W2−w1)≧14.

In the case of the following cases (1) and (2), the loop effect in the tread shoulder region is insufficient, the deviated wear suppressing effect, the peeling suppressing effect of the belt end, and the crack suppressing effect in the tread groove bottom can not achieved sufficiently.

(1) when the ply widths W2 and W3 of the second and third belt plies 7B and 7C are less than 85% of the tread ground-contact width Tw, and (2) when the ply width W4 of the fourth belt ply 7D is less than 40 mm and the distance K between the tire equator C and the outer end of the fourth belt ply 7D in the axial direction of the tire is less than 35% of the tread ground-contact width Tw.

If the distance K exceeds 40% of the tread ground-contact width Tw, a tension load in the outer end of the fourth belt ply 7D is increased, and there is a tendency that the belt cord is ruptured.

When the fourth belt ply 7D which is the endless ply is disposed, there is a tendency that a cord end loose (peeling of the belt end) is prone to be generated in the outer ends of the second and third belt plies 7B and 7C which protrude outward from the fourth belt ply 7D in the axial direction of the tire.

Hence, according to the present invention, as shown in FIG. 2, a reinforcing rubber layer 10 is disposed between the second and third belt plies 7B and 7C and at the outer end in the axial direction of the tire. The reinforcing rubber layer 10 is made of rubber having low elasticity. A complex elastic modulus E*1 of the reinforcing rubber layer 10 is in a range of 6.0 to 12.0 MPa. The reinforcing rubber layer 10 moderates a shearing force which centers on the outer ends of the second and third belt plies 7B and 7C, and suppresses the cord end loose (peeling of the belt end) at the outer end. The rubber thickness T of the reinforcing rubber layer 10 is gradually increased from its inner end toward its outer side in the axial direction of the tire. When W2 is greater than W3 as in this embodiment, the rubber thickness T becomes the maximum thickness T1 in the outer end of the third belt ply 7C. It is necessary that the maximum thickness T1 is not less than 3.0 mm, and if the maximum thickness T1 is less than 3.0 mm, the shearing force moderating effect becomes insufficient, and it becomes difficult to suppress the cord end loose. If the maximum thickness T1 exceeds 6.0 mm, the gauge thickness of the tread rubber is extremely reduced, and this is disadvantageous for the deviated wear. If the complex elastic modulus E*1 of the reinforcing rubber layer 10 exceeds 12.0 MPa, the shearing force moderating effect becomes insufficient, and it becomes difficult to suppress the cord end loose. If the complex elastic modulus E*1 becomes less than 6.0 MPa, motion of the cord end is increased, and the cord end loose is generated. By the same reason, it is preferable that the rubber hardness of the reinforcing rubber layer 10 is in a range of 65 to 75°. The rubber hardness is durometer A hardness which is measured by a durometer type A based on JIS-K6253.

The outer end of the first belt ply 7A is gradually separating from the carcass 6 toward the outer side in the axial direction of the tire. This separating portion J is provided with a cushion rubber 11 having a triangular cross section. A complex elastic modulus E*2 of the cushion rubber 11 is in a range of 2.0 to 5.0 Mpa, and E*2 is smaller than E*1. The cushion rubber 11 suppressed damage of the outer end of the belt ply 7A. In this embodiment, the cushion rubber 11 includes a thin sheet-like auxiliary layer portion 11a extending between the first belt ply 7A and the carcass ply 6A to the tire equator C. The auxiliary layer portion 11a has the thickness of 0.5 to 2.0 mm. With this, the shearing force caused by the difference between the cord angles between the first belt ply 7A and the carcass ply 6A is further reduced.

In this embodiment, a tread rubber 2G is disposed on the tread portion 2 through an adhesive rubber layer 12 which is thinner (e.g., not more than 0.5 mm) than the auxiliary layer portion 11a. The adhesive rubber layer 12 extends along an outer surface of the fourth belt ply 7D, an outer surface of the third belt ply 7C, an outer end surface of the reinforcing rubber layer 10 and an outer surface of the cushion rubber 11. The tread rubber 2G comprises a base rubber portion 2Gb which is adjacent to the belt layer 7, and a cap rubber 2Gc forming the tread surface. The base rubber portion 2Gb is adjacent to the outer end surface of the reinforcing rubber layer 10 through the adhesive rubber layer 12. The adhesive rubber layer 12 may be removed. Like the conventional technique, the base rubber portion 2Gb has rubber hardness of about 64°, and a complex elastic modulus E*3 of about 5 Mpa, and the reinforcing rubber layer 10 has higher hardness and higher elasticity than the base rubber portion 2Gb.

Figure 4:
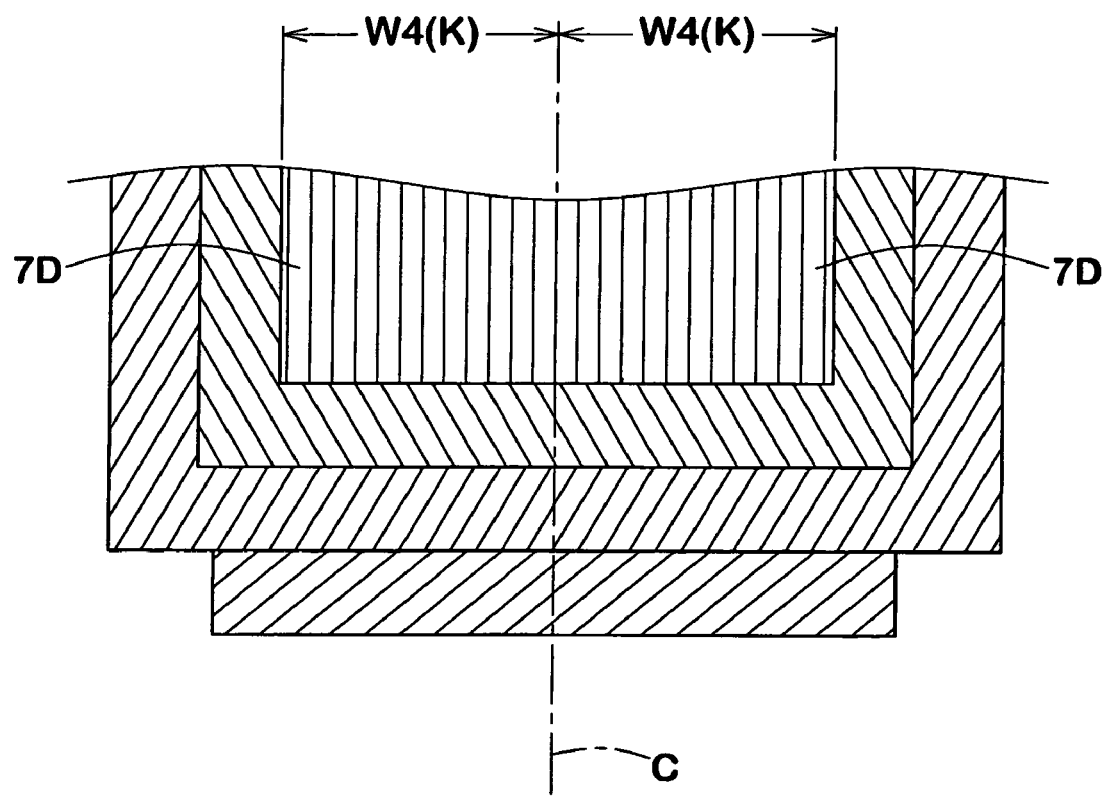
FIG. 4 is a diagram used for explaining arrangement of cords of belt plies of another embodiment.
Figure 5:
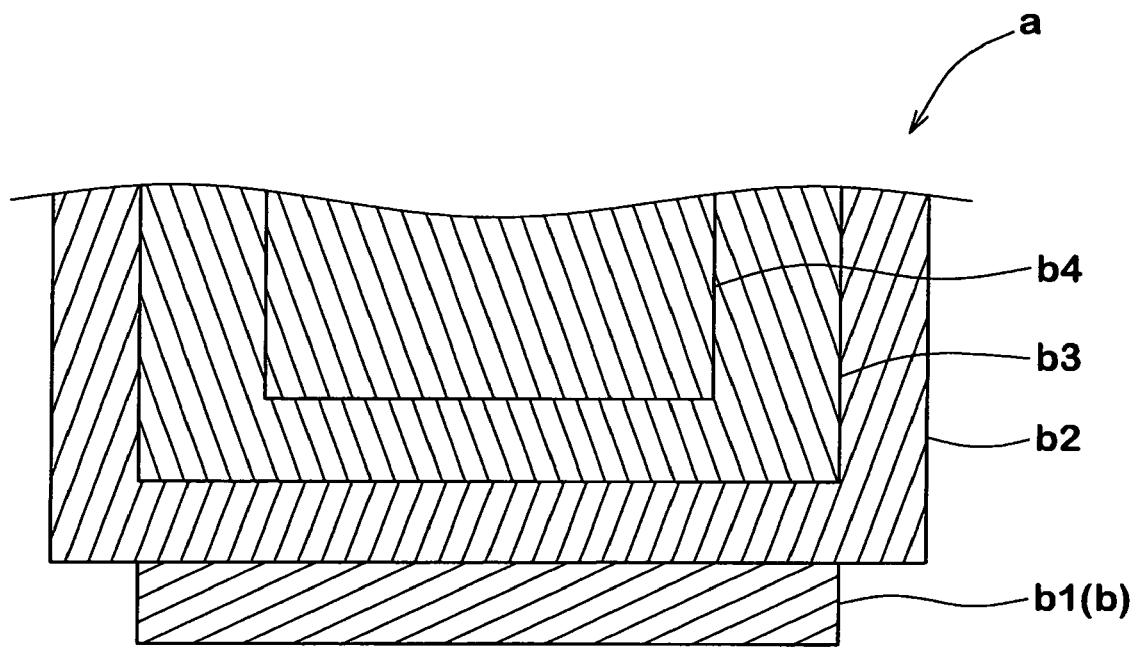
FIG. 5 is a diagram used for explaining arrangement of cords of belt plies of a conventional tire.

In the present invention, as schematically shown in FIG. 4, the ply width W4 of the fourth belt ply 7D can be set equal to the distance K. At that time, both the left and right fourth belt plies 7D and 7D are disposed such that inner ends of thereof abut against each other on the tire equator C. In the same embodiment, the ply width W4 of the fourth belt ply 7D may be one wide play which is two times (2×K) of the distance K, and the fourth belt ply 7D may be disposed on the tire equator C. The upper limit of the ply width W4 of the fourth belt ply 7C is two times (2×K) of the distance K.

Although the preferred embodiment of the present invention has been explained in detail, the invention is not limited to the illustrated embodiment and can variously be modified and carried out.

EXAMPLES

Wide heavy load radial tires having the structure shown in FIG. 1 and tire size of 435/45R22.5 were prototyped based on the specification shown in Table 1. Based on the prototyped tires, deviated wear resistance, crack resistance in groove bottom, peeling resistance of belt end, outer diameter growth resistance, and presence and absence of cord cut in a fourth belt play end were tested and evaluated.

In the conventional tire, the cord angles in the first to third and fifth belt plies are set as follow: the cord angle θ1 (+50°), the cord angle θ2 (+18°), the cord angle θ3 (−18°) and the cord angle θ5 (−18°). In the tires of the examples and the comparative examples, the cord angles in the first to fifth belt plies are set as follow: the cord angle θ1 (+50°), the cord angle θ2 (+18°), the cord angle θ3 (−18°), the cord angle θ4 (about 0°; spirally winding °) and the cord angle θ5 (−18°). In the examples 1 and 3 to 6, and the comparative examples 1 to 6, two fourth belt plies are disposed on left and right sides one each. In the example 2, one fourth belt ply is disposed on the tire equator.

(1) Deviated wear resistance: the prototyped tires were set to all of wheels of a test vehicle of 2-D•4 under the conditions of rim (22.5×14.00) and internal pressure (900 kPa), and the vehicle run on a road including an expressway, an urban road and a mountain road through total 10,000 km. The depth of remaining groove of the shoulder groove after running, and the depths were compared with each other using indices in which the conventional example is defined as 100. As the numeric value is greater, the deviated wear resistance is more excellent.

(2) Crack resistance: After running, presence and absence of a crack in the groove bottom of the shoulder groove were visually checked.

(3) Peel resistance of belt end, and cut of cord in the fourth belt play end: After running, the tires were tore down, presence and absence of the peeling of the belt end (in the case of the presence, the length of the peeling portion), and presence and absence of cut of cord in the fourth belt ply end were checked.

TABLE 1

|  | Conventional Example | Example 1 | Comparative Example 1 | Comparative Example 2 | Comparative Example 3 | Comparative Example 4 |
|---|---|---|---|---|---|---|
| Ply width W1 (*1) | 0.90 | 0.90 | 0.90 | 0.90 | 0.90 | 0.90 |
| Ply width W2 (*1) | 0.96 | 0.96 | 0.96 | 0.96 | 0.96 | 0.96 |
| Ply width W3 (*1) | 0.91 | 0.91 | 0.91 | 0.91 | 0.91 | 0.94 |
| Ply width W4 (mm) | — | 40 | 7 | 19 | 4 | 40 |
| Ply width W5 (*1) | 0.45 | 0.45 | 0.80 | 0.45 | 0.45 | 0.49 |
| Distance K (*1) | — | 0.35 | 0.425 | 0.3 | 0.355 | 0.355 |
| Distance L (mm) | 10 | 10 | 10 | 10 | 10 | 5 |
| Reinforcing rubber layer |  |  |  |  |  |  |
| Complex elastic modulus E*1 (Mpa) | 9.3 | 9.3 | 9.3 | 9.3 | 9.3 | 9.3 |
| Maximum thickness T1 (mm) | 3.5 | 3.5 | 3.5 | 3.5 | 2.5 | 3.5 |
| Deviated wear resistance | 100 | 150 | 150 | 100 | 100 | 150 |
| Crack | Presence | Absence | Absence | Presence | Presence | Absence |
| Peeling of belt end | Absence | Absence | Absence | Absence | 10 mm | 10 mm |
| Cut of belt cord | Absence | Absence | Presence | Absence | Absence | Absence |

|  | Example 2 | Example 3 | Example 4 | Example 5 | Comparative Example 5 | Example 6 | Comparative Example 6 |
|---|---|---|---|---|---|---|---|
| Ply width W1 (*1) | 0.90 | 0.90 | 0.90 | 0.90 | 0.90 | 0.90 | 0.90 |
| Ply width W2 (*1) | 0.96 | 0.96 | 0.96 | 0.96 | 0.96 | 0.96 | 0.96 |
| Ply width W3 (*1) | 0.91 | 0.92 | 0.91 | 0.91 | 0.91 | 0.91 | 0.91 |
| Ply width W4 (mm) | 135 | 40 | 40 | 40 | 4 | 90 | 19 |
| Ply width W5 (*1) | — | 0.49 | 0.59 | 0.49 | 0.45 | 0.24 | 0.45 |
| Distance K (*1) | 0.355 | 0.355 | 0.4 | 0.355 | 0.355 | 0.355 | 0.355 |
| Distance L (mm) | 10 | 7 | 10 | 10 | 10 | 10 | 10 |
| Reinforcing rubber layer |  |  |  |  |  |  |  |
| Complex elastic modulus E*1 (Mpa) | 9.3 | 9.3 | 9.3 | 9.3 | 3.0 | 9.3 | 9.3 |
| Maximum thickness T1 (mm) | 3.5 | 3.5 | 3.5 | 3 | 3.5 | 3.5 | 3.5 |
| Deviated wear resistance | 150 | 150 | 150 | 150 | 100 | 150 | 130 |
| Crack | Absence | Absence | Absence | Absence | Presence | Absence | Absence |
| Peeling of belt end | Absence | Absence | Absence | Absence | 10 mm | Absence | Absence |
| Cut of belt cord | Absence | Absence | Absence | Absence | Absence | Absence | Absence |

(*1) Ply widths W1 to W3, W5, and Distance K are shown with radio to the tread ground-contact width Tw.

As shown in Table, it can be confirmed that the tires of the examples can suppress the deviated wear, and cracks in the tread groove bottom while securing durability of the tread portion.

What is claimed is:

1. A heavy load radial tire comprising a carcass extending from a tread portion to a bead core of a bead portion through a sidewall portion, and a belt layer disposed radially outward of the carcass and in the tread portion, wherein the belt layer includes a first belt ply disposed on the radially innermost side of the belt layer and radially outward of the carcass, in which belt cords are arranged at an angle θ1 of 45 to 75° with respect to a circumferential direction of the tire, a second belt ply disposed radially outward of the first belt ply, in which belt cords are arranged at an angle θ2 of 10 to 45° with respect to the circumferential direction of the tire, and the belt cord angle θ1 of the first belt ply is greater than the angle θ2, a third belt ply disposed radially outward of the second belt ply, in which belt cords are arranged at an angle θ3 of 10 to 45° with respect to the circumferential direction of the tire and an inclining direction of the belt cords of the third belt ply is opposite from that of the belt cords of the second belt ply, and a fourth belt ply comprising a pair of plies which is disposed radially outward of the third belt ply and at a distance from each other on both sides of a tire equator, in which a belt cord is spirally wound at an angle θ4 of not more than 5° with respect to the circumferential direction of the tire in each of the fourth belt plies, wherein ply widths W2 and W3 of the second and third belt plies in an axial direction of the tire are not less than 85% of a tread ground-contact width Tw, a ply width W4 of the fourth belt ply in the axial direction of the tire is not less than 40 mm, an axial distance K between an outer end of the fourth belt ply and the tire equator is in a range of 35% to 40% of the tread ground-contact width Tw, a difference W2−W3 of the ply widths W2 and W3 of the second and third belt plies in the axial direction of the tire is not less than 14 mm, a reinforcing rubber layer is disposed between outer ends of the second and third belt plies in the axial direction of the tire, a maximum thickness T1 of the reinforcing rubber layer is not less than 3.0 mm, and a complex elastic modulus E*1 of the reinforcing rubber layer is in a range of 6.0 to 12.0 MPa.

2. The heavy load radial tire according to claim 1, wherein the belt layer includes a fifth belt ply above the tire equator and between a pair of the fourth belt plies, belt cords of the fifth belt ply are inclined at an angle θ5 of 10 to 45° with respect to the circumferential direction of the tire and in the same inclination direction as that of the belt cords of the third belt ply.

3. The heavy load radial tire according to claim 2, wherein the reinforcing rubber layer has a maximum thickness T1 in an outer end of the third belt ply in the axial direction of the tire.

4. The heavy load radial tire according to claim 1, wherein the reinforcing rubber layer has a maximum thickness T1 in an outer end of the third belt ply in the axial direction of the tire.

5. The heavy load radial tire according to claim 1, wherein an axially outer end portion of the belt layer is gradually separating from the carcass axially outward of the tire, a cushion rubber is disposed in this separating portion, a complex elastic modulus E*2 of the cushion rubber is in a range of 2.0 to 5.0 Mpa and is smaller than the complex elastic modulus E*1 of the reinforcing rubber layer.

6. The heavy load radial tire according to claim 5, wherein the cushion rubber includes a sheet-like auxiliary layer portion extending between the belt layer and the carcass to the tire equator, the auxiliary layer portion has a thickness of 0.5 to 2.0 mm.

7. The heavy load radial tire according to claim 1, wherein a tread rubber includes a base rubber which is adjacent to the belt layer, and a cap rubber forming a tread surface, the complex elastic modulus E*1 of the reinforcing rubber layer is greater than a complex elastic modulus E*3 of the base rubber.

8. A heavy load radial tire comprising a carcass extending from a tread portion to a bead core of a bead portion through a sidewall portion, and a belt layer disposed radially outward of the carcass and in the tread portion, wherein
the belt layer includes
a second belt ply in which belt cords are arranged at an angle θ2 of 10 to 45° with respect to a circumferential direction of the tire,
a third belt ply disposed radially outward of the second belt ply, in which belt cords are arranged at an angle θ3 of 10 to 45° with respect to the circumferential direction of the tire and an inclining direction of the belt cords of the third belt ply is opposite from that of the belt cords of the second belt ply, and
a pair of fourth belt plies disposed radially outward of the third belt ply, in which a belt cord is spirally wound at an angle θ4 of not more than 5° with respect to the circumferential direction of the tire, in which
ply widths W2 and W3 of the second and third belt plies in an axial direction of the tire are not less than 85% of a tread ground-contact width Tw,
a ply width W4 of each of the fourth belt plies in the axial direction of the tire is not less than 40 mm, an axial distance K from the tire equator to an outer end of each of the fourth belt plies is in a range of 35% to 40% of the tread ground-contact width Tw, and
a difference W2−W3 between the ply widths W2 and W3 of the second and third belt plies is not less than 14 mm,
a reinforcing rubber layer is disposed between axially outer ends of the second and third belt plies, the reinforcing rubber layer having a maximum thickness T1 of not less than 3.0 mm and a complex elastic modulus E*1 of 6.0 to 12.0 MPa, and
an axially outer portion of the belt layer is gradually separating from the carcass axially outward of the tire, and a cushion rubber is disposed in this separating portion, in which a complex elastic modulus E*2 of the cushion rubber is in a range of 2.0 to 5.0 Mpa and is smaller than the complex elastic modulus E*1 of the reinforcing rubber layer, and the cushion rubber includes a sheet-like auxiliary layer portion extending between the belt layer and the carcass to the tire equator and having a thickness of 0.5 to 2.0 mm.

9. The heavy load radial tire according to claim 8, wherein the pair of the fourth belt plies is disposed at a distance from each other on both sides of the tire equator.

10. The heavy load radial tire according to claim 9, wherein the belt layer includes a fifth belt ply disposed on the tire equator and between the pair of the fourth belt plies, and belt cords of the fifth belt ply are inclined at an angle θ5 of 10 to 45° with respect to the circumferential direction of the tire and in the same inclination direction as that of the belt cords of the third belt ply.

11. The heavy load radial tire according to claim 8, wherein the pair of the fourth belt plies are disposed so that axially inner ends thereof come in contact with each other on the tire equator.

12. The heavy load radial tire according to claim 8, wherein the pair of the fourth belt plies is formed into a single ply by spirally winding the belt cord continuously.

13. The heavy load radial tire according to claim 8, wherein the belt layer includes a first belt ply on the radially innermost side, and belt cords of the first belt ply are inclined at an angle θ1 that is greater than the angle θ2 and in a range of 45 to 75° with respect to the circumferential direction of the tire.

14. The heavy load radial tire according to claim 8, wherein the reinforcing rubber layer has a maximum thickness T1 in an axially outer end of the third belt ply.

15. The heavy load radial tire according to claim 8, wherein a tread rubber includes a base rubber which is adjacent to the belt layer, and a cap rubber forming a tread surface, the complex elastic modulus E*1 of the reinforcing rubber layer is greater than a complex elastic modulus E*3 of the base rubber.

* * * * *